United States Patent [19]

Peng

[11] 3,961,531
[45] June 8, 1976

[54] METHOD AND APPARATUS FOR ADHERING THERMOMETER IN LIQUID

[76] Inventor: Ting-Fu Peng, 6313 Fair Oaks Ave., Baltimore, Md. 21214

[22] Filed: Jan. 6, 1975

[21] Appl. No.: 539,004

Related U.S. Application Data

[63] Continuation-in-part of Ser. No. 344,076, March 23, 1973, abandoned.

[52] U.S. Cl. ................................. 73/353; 73/343 R
[51] Int. Cl.² ........................................ G01K 13/00
[58] Field of Search ................. 73/374, 353, 343 R, 73/343 B; 206/16.5; 156/57; 350/92

[56] References Cited
UNITED STATES PATENTS

| | | | |
|---|---|---|---|
| 493,197 | 3/1893 | Tagliabue | 73/353 |
| 1,316,780 | 9/1919 | Freas | 73/353 |
| 1,474,403 | 11/1923 | Chaney | 73/353 |
| 2,104,218 | 1/1938 | Betzold | 73/353 |
| 2,342,918 | 2/1944 | Busse | 350/92 |
| 2,520,911 | 9/1950 | Chaney | 73/353 |
| 2,809,525 | 10/1957 | Savage | 73/353 |
| 3,177,717 | 4/1965 | Oveson | 73/343 R |
| 3,859,156 | 1/1975 | Yazawa | 156/265 |

*Primary Examiner*—S. Clement Swisher
*Assistant Examiner*—Denis E. Corr

[57] ABSTRACT

This invention pertains to casing of floating type thermometer in liquid such as water. The casing of said thermometer consists of an elongated, a fish shaped or other configurations of glass or plastic casing having one side flat in order to adhere to the wall of a liquid container by means of "surface tension principle." The construction of the thermometer which is encased in the casing can be such conventional type, which has metal balls confined in one end of the casing as weight to keep it erect. A thermal expansive fluid containing tube is secured in a suitable manner to a graduating scale carried in the interior of the casing. The internal construction of thermometer within the casing forms no part of the instant invention.

1 Claim, 13 Drawing Figures

METHOD AND APPARATUS FOR ADHERING THERMOMETER IN LIQUID

BACKGROUND OF THE INVENTION

This application is a continuation-in-part to now abandoned application Ser. No. 344,076 filed Mar. 23, 1973.

Floating thermometers have been long used for reading temperature in liquid, and while they represent widely varying forms and constructions, they appear to have a common characteristic of round cross section casing. Without supplementary fastening devices, these thermometers will rotate under the condition when liquid in the container is not static; therefore the temperature scale of such free standing and floating thermometer always turns away from view. This causes inconvenience to the viewer in having to turn the thermometer scale outwards again by hand. The present invention achieves the result by eliminating the use of any fastening device to adhere the thermometer in liquid container with temperature scale facing outwards always.

This invention relates to means for adhering floating type thermometer in liquid therefrom and to casing which is a new and novel device for adhering the said floating type thermometer to the wall of container in liquid and more particularly in water.

OBJECTS OF THE INVENTION

It is a primary object of the invention to provide new and novel method to adhere a thermometer in liquid to the wall of a container and eliminate the use of fastening device. The method to adhere the thermometer applied the "adhesion" resulting from surface tension, which is illustrated in drawing.

It is another object of the present invention to implement new and novel device so as to eliminate the use of the supplementary device of floating thermometer and achieve the same purpose to adhere the thermometer to the wall of container in non-static liquid.

Other objects of the invention are to provide a casing of thermometer which is simple and integral in design, inexpensive to manufacture, easy to use and efficient in operation.

These and other objects will be readily evident upon a study of the following specifications together with the accompanying drawings, wherein.

Figure 6:
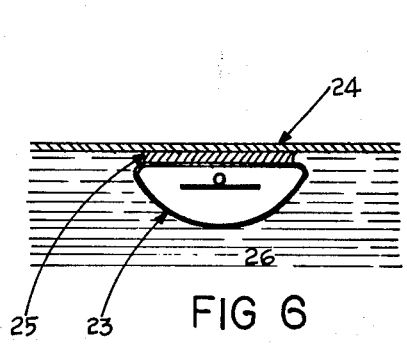
Figure 12:
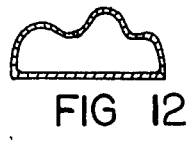
Figure 11:
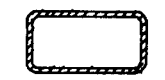
Figure 10:

FIG. 6 is a cross-sectional view taken along the line 6—6 to illustrate how adhesion 25 applies between thermometer casing 23 and glass wall of liquid container 24.

Figure 7:
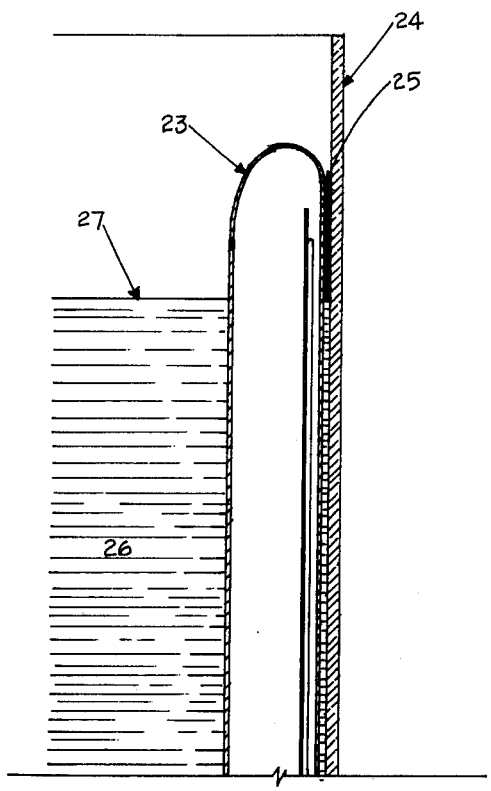
Figure 8:
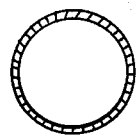
Figure 9:
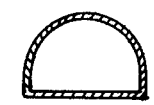

FIG. 7 is an enlarged cross-sectional view taken along the line 8—8 to illustrate again adhesion 25 applies between thermometer casing 23 and glass wall of liquid container 24. 26 and 27 indicate liquid and water level respectively;

FIG. 8 indicates cross-sectional view of a prior art floating thermometer; and

FIGS. 9, 10, 11 and 12 indicate a few varieties of cross section as examples of my present invention.

Figure 13:
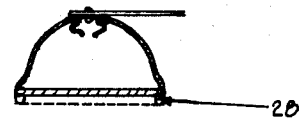

FIG. 13 indicates cross-section of another prior art thermometer which is different from my invention in terms of construction detail. A possible thermoinsulation layer or device 28 is indicated.

According to this invention, a thermometer 10 is shown to consist of a hollow fish-shaped configurated casing 11 made of glass or plastic. Casing 11 is provided with a flat side 12 for adhering with the interior surface of the container wall, the side 12 serving to prevent rotation or movement of thermometer 10. The opposite side of casing 11 is curved as shown by the numeral 13 on the drawing. Within the lower or tail portion of casing 11 are a plurality of metal balls 14 or the like providing weight means for enabling thermometer 10 to remain in an upright and vertical position. Within the center of casing 11 is a tube 15 having a thermal expansive fluid for indicating the temperature of the liquid in container by means of the graduated scale 16 to which tube 15 is attached in a suitable manner (not shown).

In use, thermometer 10 is placed within the liquid of the container so that the flat side 12 of casing 11 will be in adherence with the glass surface of the interior of the container. The flat side 12 prevents thermometer 10 from rotating and thus enable the viewer to quickly and immediately read the temperature without having to move thermometer 10 by hand to observe the graduations of the scale 16.

Figure 3:
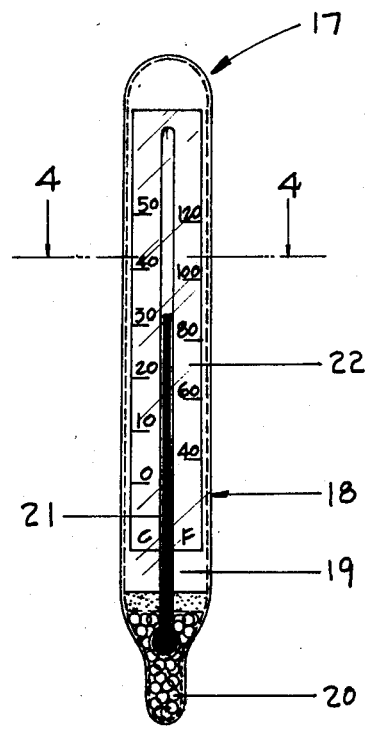
FIG. 3 is a plan view of a varied form of the invention.
Figure 4:
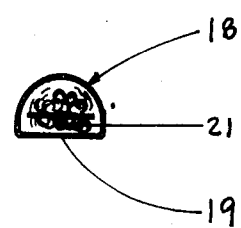
FIG. 4 is an enlarged cross-sectional view taken along the line 4—4 of FIG. 3.
Figure 5:
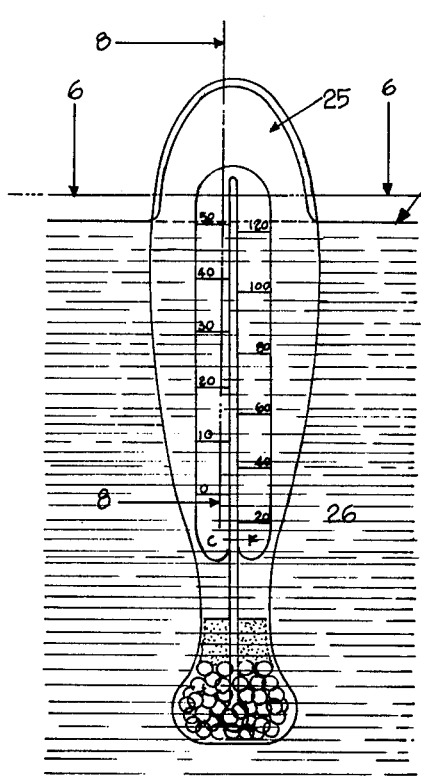
FIG. 5 is a plan view to indicate adhesion area 25 above liquid level 27.

Referring now to FIGS. 3 and 4 of the drawing, 17 is another example of thermometers having an elongated casing 18, one side of which is flat as shown by the numeral 19, side 19 serving the same purpose as heretofore described in the main embodiment of the device. Casing 18 also includes metal balls 20 for maintaining weight so that the casing 18 will remain vertical while floating within the container. A thermal expansive fluid containing tube 21 is secured in a suitable manner to a graduating scale 22 carried on the interior of casing 18, the combination of the tube 21 and the scale 22 serving as a means for indicating water temperature.

It will be understood that the internal construction in the casing is for the purpose of description only. It can be modified and changed in any construction to fit into the casing which is also not for limitation of construction as illustrated above, as long as the casing provides a flat side.

CASE STUDY, ANALYSIS AND COMPARISON OF PRESENT INVENTION WITH L. F. CHANEY'S FLOATING THERMOMETER (U.S. Pat. No. 2,520,911) AND E. W. OVESON'S INDOOR-OUTDOOR THERMOMETER (U.S. Pat. No. 3,177,717)

After careful study of L. F. Chaney's Floating Thermometer, the casing of his thermometer is apparently round in cross section. From Column 1, line 44: "The casing 1 is ordinarily of straight cylindrical form terminating in a uniformly tapered extremity merging into the cylindrical walls of the casing without interruption . . ." Chaney's cross-section of the casing shown in FIG. 7 is obviously different from my invention in terms of Cross-section construction. It is necessary to point out that the cross-section of my invention has a flat side which associates with any kind of configuration and is not limited to combination of round and flat section.

Figure 2:
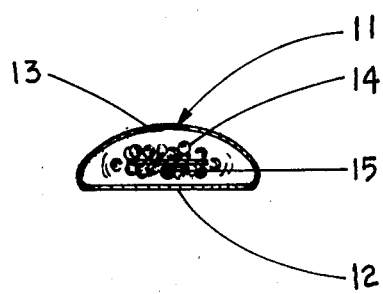
FIG. 2 is an enlarged cross-sectional view taken along the line 2—2 of FIG. 1.

The combination of round and flat section shown in FIG. 2 is only one example of cross sections. Moreover, the flat side has significant function implied which serves as an instrument to adhere the thermometer to the wall of container by adhesion resulting from surface tension.

Figure 1:
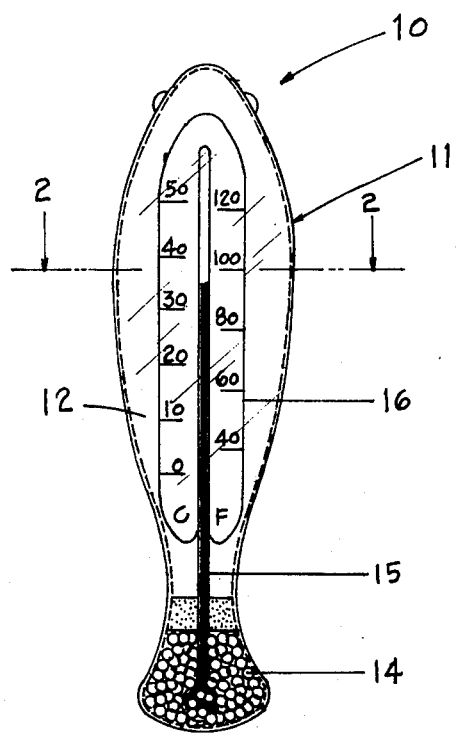
FIG. 1 is an enlarged plan view of the present invention.

After studying and reviewing of E. W. Oveson's Indoor Outdoor Thermometer, I discovered that his drawing of the invention had numerical errors: in FIG. 1, No. 16 and No. 20 did not coincide with No. 16 and No. 20 in FIG. 3 and FIG. 4. In addition, Oveson's Outdoor thermometer could not work well since heat would transfer through tightly abutted glass 50 and 20, either from indoor to outdoor or from outdoor to indoor to affect the accuracy of outdoor temperature reading. This is in evidence as follows: In column 2, Line 3, "A flat transparent cover of glass, plastic or the like 20 is mounted to the front side 22 of housing 16 to protect dial 14". In column 2, line 72; ". . . the outdoor thermometer 10 is supported flush against the outer side of window 50 sufficiently tight enough from the spring action of clip member 28 that snow, rain or sleet will not normally infiltrate between cover 20 of thermometer 10 and the outer side of window 50 so as to interfere with the visibility of dial 14 from the inside". Therefore, insulation layer is needed between glass 50 and 20 to prevent heat flow. The insulation layer can block the dial from vision. Moreover, in comparison of Oveson's thermometer with my invention in terms of construction, Oveson's thermometer casing is composed of several parts such as housing 16, glass cover 20, central opening 26, support member 28, resilient clip 46, etc. Whereas in my invention, the casing is an integral entity; it is substantially different from Oveson's casing construction. In comparison of abutting methods, Oveson's outdoor thermometer abuts the flat side casing to glass tightly by means of mechanic device —"the spring action of clip member 28", while my invention adheres the thermometer casing to glass by adhesion resulting from surface tension. There exists, in my invention, a layer of water film between thermometer casing and glass instead of the thermometer casing and glass abutting tightly as in Oveson's method. Also, Oveson's device can cause water leakage into the casing if used in water, while my invention is for usage in water.

Conclusively, Chaney's casing is not associated with my invented casing in terms of construction and function. While Oveson's casing has the similarlity of flatted casing, it is obviously different from my invention in terms of construction detail, purpose of usage, function and method.

I claim:

1. A method for adhering a floating thermometer casing to the wall of liquid container including the steps of providing a flat surface on said casing which is to hold the thermometer, placing the thermometer and casing in the liquid of said container and arranging said flat surface to be next to said wall of said container, and allowing surface tension of said liquid to adhere said casing to said liquid container thereby preventing the thermometer and casing from rotating.

* * * * *